United States Patent
Fujita et al.

(10) Patent No.: US 12,404,933 B2
(45) Date of Patent: Sep. 2, 2025

(54) SEALING DEVICE

(71) Applicant: UCHIYAMA MANUFACTURING CORP., Okayama (JP)

(72) Inventors: Wakana Fujita, Akaiwa (JP); Keita Ohmori, Akaiwa (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 0 days.

(21) Appl. No.: 18/595,000

(22) Filed: Mar. 4, 2024

(65) Prior Publication Data
US 2024/0301917 A1 Sep. 12, 2024

(30) Foreign Application Priority Data
Mar. 7, 2023 (JP) ................. 2023-034552

(51) Int. Cl.
*F16J 15/3256* (2016.01)
*F16C 33/78* (2006.01)
*F16C 33/80* (2006.01)
*F16J 15/447* (2006.01)

(52) U.S. Cl.
CPC ....... F16J 15/3256 (2013.01); F16C 33/7883 (2013.01); F16C 33/805 (2013.01); F16J 15/4472 (2013.01); *F16C 33/7823* (2013.01); *F16C 33/80* (2013.01); *F16J 15/4474* (2013.01); *F16J 15/4476* (2013.01); *F16J 15/4478* (2013.01)

(58) Field of Classification Search
CPC .............. F16C 33/7823; F16C 33/7826; F16C 33/7883; F16C 33/80; F16J 15/4472
See application file for complete search history.

(56) References Cited

U.S. PATENT DOCUMENTS

| 5,186,472 | A | * | 2/1993 | Romero | F16J 15/3256 277/572 |
| 6,702,295 | B1 | * | 3/2004 | Kapcoe | F16J 15/3252 277/572 |
| 8,657,296 | B1 | * | 2/2014 | Banowetz | F16J 15/3256 277/412 |
| 9,151,391 | B2 | * | 10/2015 | Kern-Trautmann | B23P 6/00 |
| 9,523,059 | B2 | * | 12/2016 | Kunishima | C08J 7/043 |

(Continued)

FOREIGN PATENT DOCUMENTS

| JP | 2009-298367 A | 12/2009 |
| JP | 2011-012740 A | 1/2011 |

*Primary Examiner* — Nicholas L Foster
(74) *Attorney, Agent, or Firm* — MUNCY, GEISSLER, OLDS & LOWE, P.C.

(57) ABSTRACT

A sealing device to seal an annular space formed by a fixed side member and a rotation side member, including a first seal member and a second seal member, and being provided between the two members in a state in which the first and the second seal members are combined. The sealing device includes a coating layer having an easily scraped property and being provided at least at one place in a gap between facing regions in which the first and the second seal members are provided so as to face each other in an initial state in which the first and the second seal members are combined. The coating layer slidably contacts a region to which the coating layer faces in a state in which the first and the second seal members rotate relative to each other from the initial state.

11 Claims, 8 Drawing Sheets

(56) References Cited

U.S. PATENT DOCUMENTS

| | | | |
|---|---|---|---|
| 10,294,441 B2* | 5/2019 | Sasaki | C10M 107/32 |
| 11,428,110 B2* | 8/2022 | Jouy | F01D 11/127 |
| 11,739,654 B2* | 8/2023 | Perez | F16J 15/447 |
| | | | 277/412 |
| 2002/0064325 A1* | 5/2002 | Yeo | F16C 33/6618 |
| | | | 384/484 |
| 2011/0089642 A1* | 4/2011 | Terasawa | F16C 41/007 |
| | | | 277/562 |
| 2011/0222805 A1* | 9/2011 | Sasaki | F16C 33/7823 |
| | | | 384/477 |
| 2014/0333032 A1* | 11/2014 | Kern-Trautmann | F16J 15/453 |
| | | | 277/412 |
| 2016/0068779 A1* | 3/2016 | Kunishima | F16J 15/324 |
| | | | 508/106 |
| 2017/0073605 A1* | 3/2017 | Sasaki | F16D 69/025 |
| 2020/0400033 A1* | 12/2020 | Jouy | F16J 15/447 |
| 2022/0120189 A1* | 4/2022 | Perez | F01D 11/02 |

* cited by examiner

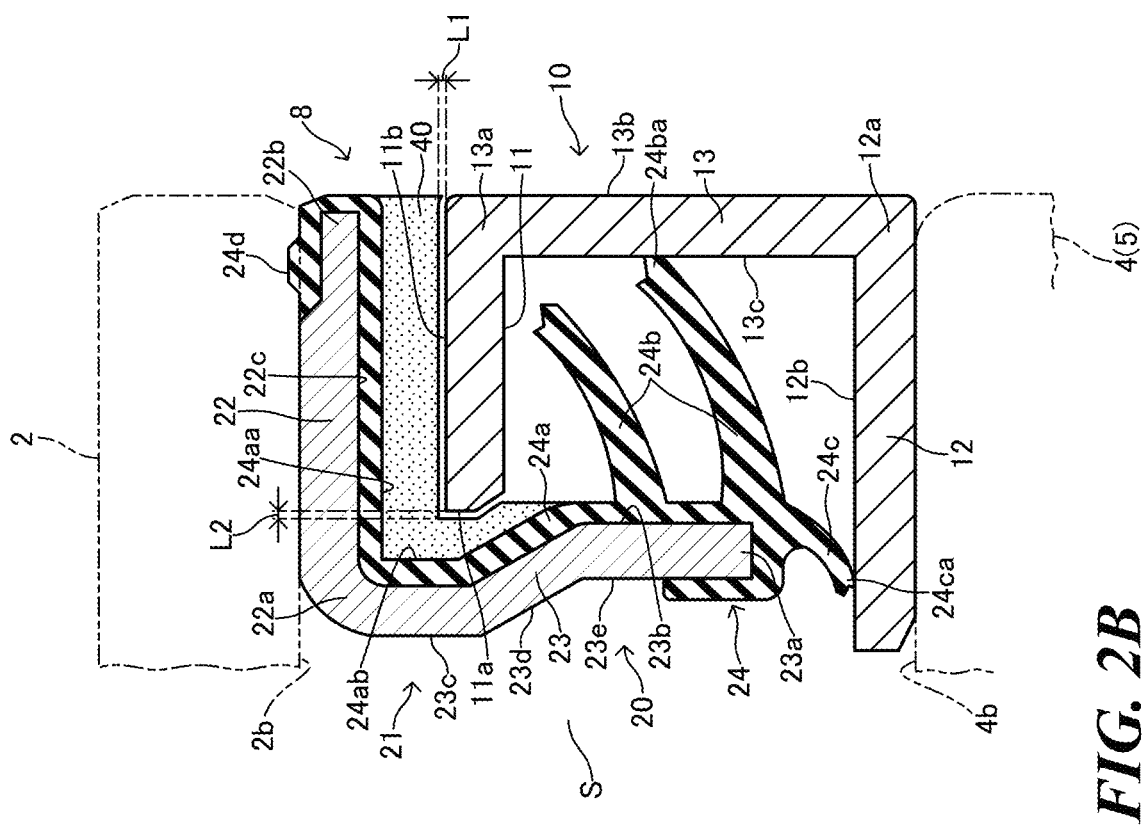
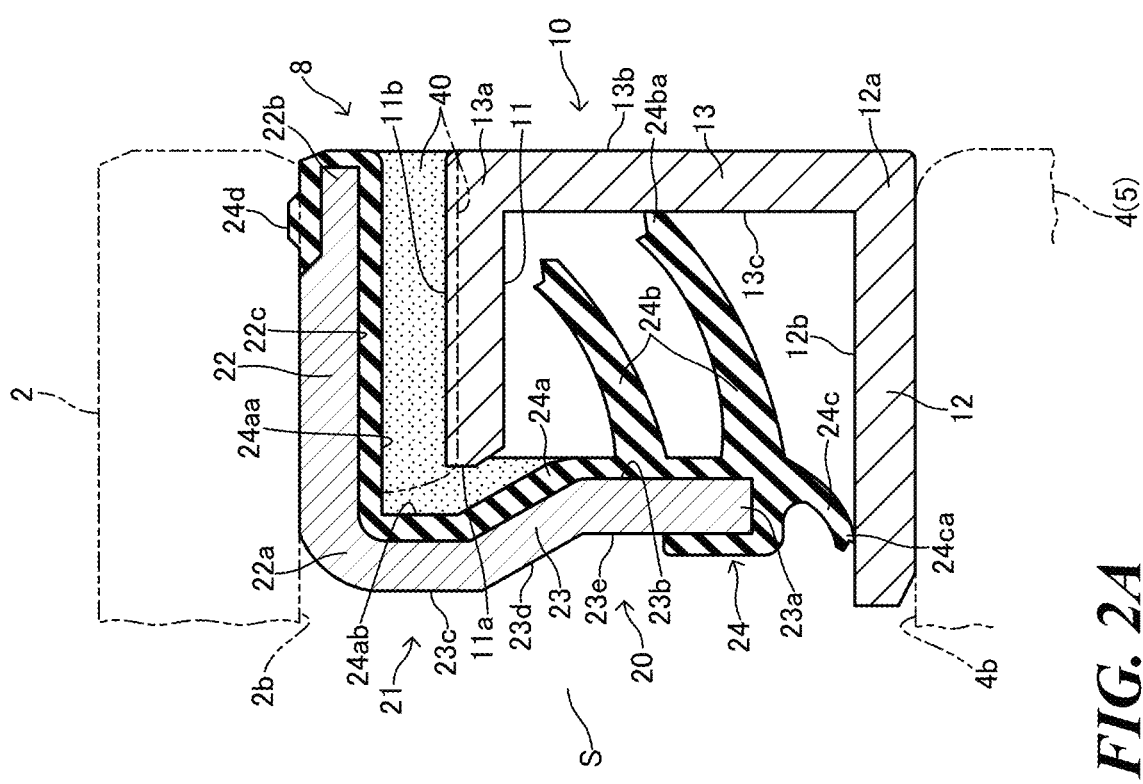
FIG. 2A
FIG. 2B

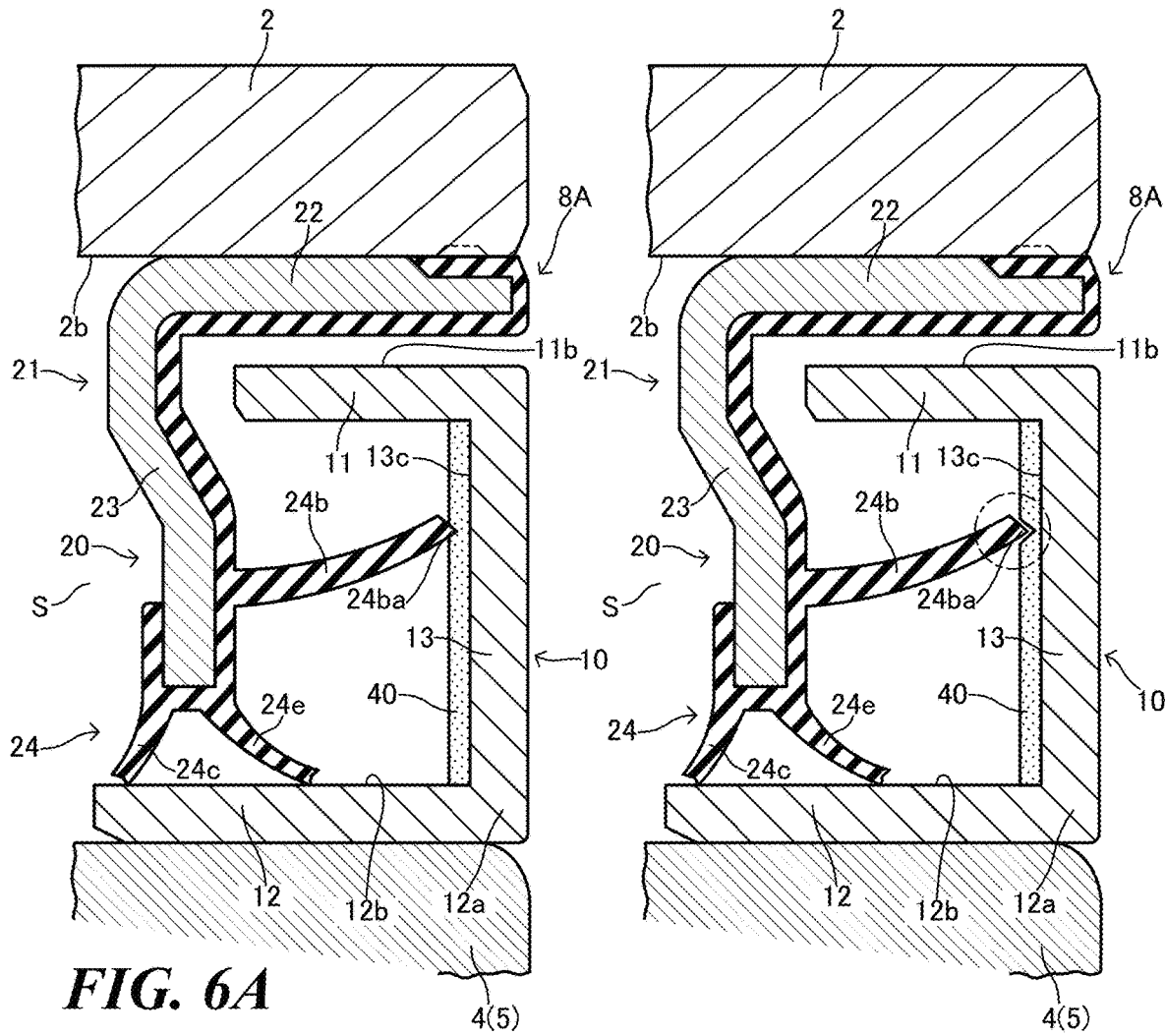
*FIG. 6A*
*FIG. 6B*
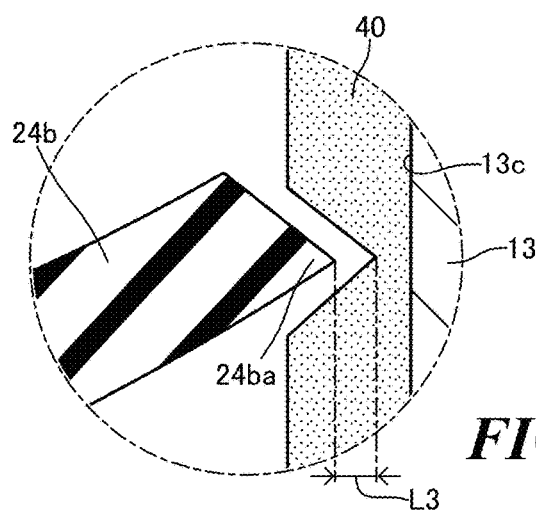
*FIG. 6C*

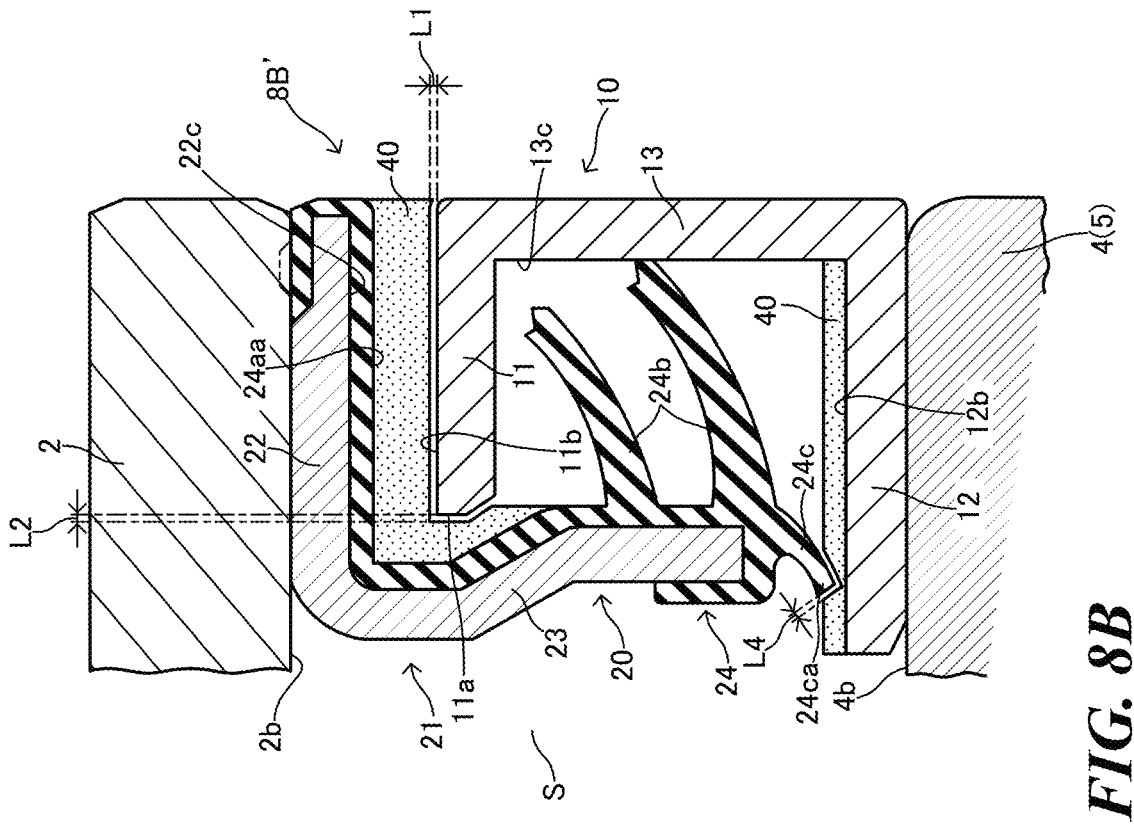
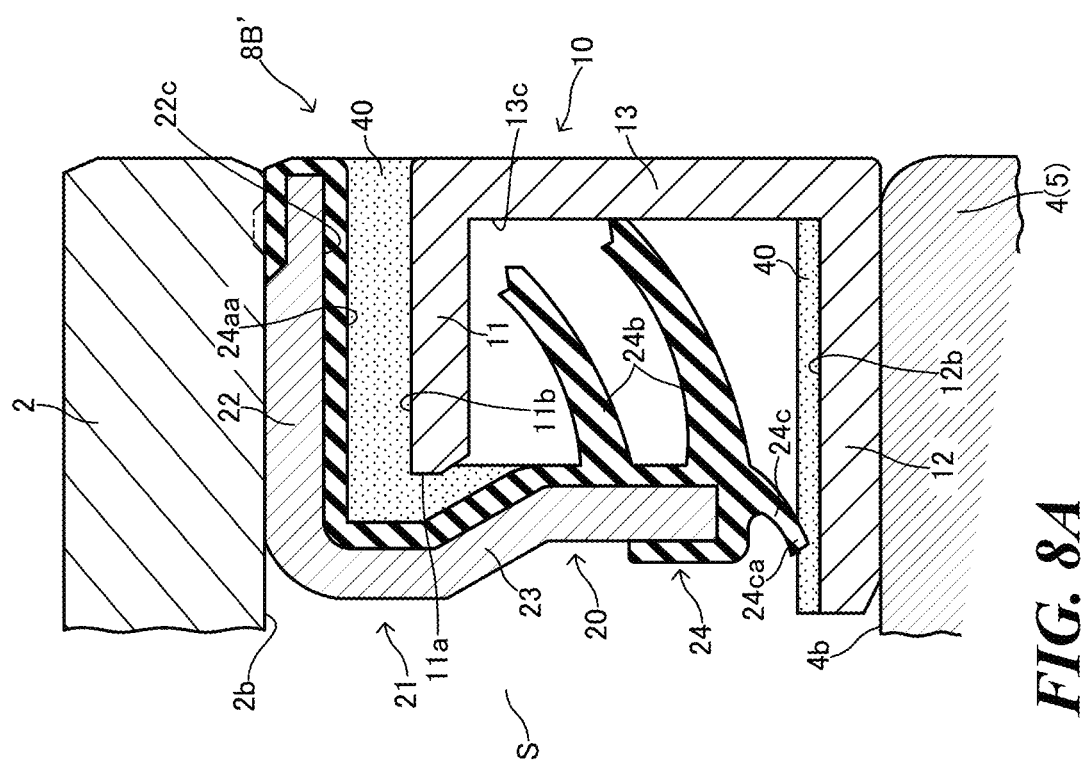

SEALING DEVICE

BACKGROUND OF THE INVENTION

Field of the Invention

The present invention relates to a sealing device which seals an annular space formed by two members, a fixed side member and a rotation side member, which includes a first seal member to be fitted to the rotation side member and a second seal member to be fitted to the fixed side member, and which is provided between the two members.

Description of the Related Art

The following Patent Documents 1 and 2 disclose a sealing device which has the above-mentioned structure provided in a wheel bearing device. The following Patent Document 1 describes an example, etc., in which a water-repellent treated layer is each provided on contact parts of an inner member and an outer member with a sealing member and the water-repellent treated layer is provided on an entire surface of the sealing member. According to the above, it is said that an intrusion of muddy water or the like is suppressed by providing the water-repellent treated layer on a part into which muddy water or the like is likely to intrude. Further, the following Patent Document 2 describes a sealing device in which a lubrication film using hydrophilic resin as binder is formed on a surface of a lip made of rubber provided for the sealing device. According to the above, by forming the lubrication film on the lip, it is said that sliding resistance of the lip is suppressed and thereby an effect of reduction in rotational torque is achieved.

RELATED ART DOCUMENT

Patent Document

Patent Document 1: Japanese Unexamined Patent Application Publication No. 2009-298367
Patent Document 2: Japanese Unexamined Patent Application Publication No. 2011-12740

SUMMARY OF THE INVENTION

Problems to be Solved by the Invention

Meanwhile, the sealing device as described above has a problem to achieve both sealing performance and torque reduction. In one well-known solution to solve the problem, a labyrinth, i.e., a gap, is structured to suppress intrusion of muddy water or the like instead of arranging a seal lip at a region into which muddy water or the like intrudes. The smaller the gap constituting the labyrinth becomes, the more the sealing performance is improved and the torque reduction is achieved since the gap does not slidably contact a member which is arranged to face the gap. However, in the case of the sealing device which is constituted by two members and is provided between the two members, since a dimensional tolerance or the like of each member and each part needs to be considered, there is a limit to a dimension of the labyrinth which is possible to be designed.

The present invention is proposed in view of the above-mentioned problems, and an object of the present invention is to provide a sealing device which achieves both sealing performance and torque reduction even without considering a dimensional tolerance of each member and each part which constitute the sealing device.

Means of Solving the Problems

In order to achieve the above-mentioned object, a sealing device of one aspect of the present invention seals an annular space formed by two members, a fixed side member and a rotation side member which rotates coaxially relative to the fixed side member, includes a first seal member to be fitted to the rotation side member and a second seal member to be fitted to the fixed side member, and is provided between the two members in a state in which the first seal member and the second seal member are combined. The sealing device includes a coating layer having an easily scraped property and being provided at least at one place in a gap between facing regions in which the first seal member and the second seal member are provided so as to face each other in an initial state in which the first seal member and the second seal member are combined, the coating layer slidably contacts a region to which the coating layer faces in a state in which the first seal member and the second seal member rotate relative to each other from the initial state.

In the sealing device of another aspect of the present invention, the first seal member includes a first fitting cylindrical portion to be fitted to the rotation side member, a first disk portion extending in outer diametrical direction from one end portion of the first fitting cylindrical portion, and an extension cylindrical portion extending in axial direction from one end portion of the first disk portion on an outer diametrical side, the second seal member includes a second fitting cylindrical portion to be fitted to the fixed side member, the extension cylindrical portion of the first seal member and the second fitting cylindrical portion of the second seal member are provided so as to face each other in radial direction in a state in which the sealing device is provided between the fixed side member and the rotation side member, and the gap between the facing regions can be a gap between the extension cylindrical portion and the second fitting cylindrical portion.

In the sealing device of another aspect of the present invention, the first seal member includes a first fitting cylindrical portion to be fitted to the rotation side member and a first disk portion extending in outer diametrical direction from the one end portion of the first fitting cylindrical portion, the second seal member includes a core body member having a second fitting cylindrical portion to be fitted to the fixed side member, and a seal lip portion fixed to the core body member, the seal lip portion is provided so as to slidably contact the first disk portion of the first seal member, the seal lip portion and the first disk portion face each other in axial direction, and the gap between the facing regions can be a gap between the first disk portion and the seal lip portion.

Further, in the sealing device of another aspect of the present invention, an uneven portion or a roughed surface portion of which surface is rougher than other surfaces can be provided on at least either one of surfaces in which the extension cylindrical portion and the second fitting cylindrical portion face each other. Furthermore, in the sealing device of another aspect of the present invention, the coating layer can be composed of a solid lubricant into which a powdered additive to reduce a coefficient of friction is mixed, or can be composed of a liquid adhesive of a curing reaction type.

Effects of the Invention

Constituted as above, the sealing device of the present invention achieves both sealing performance and torque reduction even without considering a dimensional tolerance of each member and each part which constitute the sealing device.

BRIEF DESCRIPTION OF THE DRAWINGS

FIGS. 2A and 2B are views illustrating the sealing device according to the first embodiment of the present invention. FIG. 2A is a schematic cross-sectional view illustrating the initial state in which the first seal member and the second seal member are combined. FIG. 2B is a schematic cross-sectional view illustrating a state in which a labyrinth is formed by relative rotation of the first seal member and the second seal member.

FIG. 3A is a schematic cross-sectional view illustrating only one member at which a projection portion is provided. FIG. 3B is a schematic cross-sectional view illustrating the initial state in which the first seal member and the second seal member are combined. FIG. 3C is a schematic cross-sectional view illustrating the state in which the labyrinth is formed by the relative rotation of the first seal member and the second seal member.

FIG. 4A is a schematic cross-sectional view illustrating an initial assembled state in which the first seal member and the second seal member are combined. FIG. 4B is a schematic cross-sectional view illustrating the state in which the labyrinth is formed by the relative rotation of the first seal member and the second seal member.

FIG. 5A is a schematic cross-sectional view illustrating only one member to which roughing surface treatment is performed. FIG. 5B is a schematic cross-sectional view illustrating the initial state in which the first seal member and the second seal member are combined. FIG. 5C is a schematic cross-sectional view illustrating the state in which the labyrinth is formed by the relative rotation of the first seal member and the second seal member.

FIGS. 6A and 6B are views illustrating the third embodiment according to the present invention, and is an enlarged view of the part X in FIG. 1. FIG. 6A is a schematic cross-sectional view illustrating the initial state in which the first seal member and the second seal member are combined. FIG. 6B is a schematic cross-sectional view illustrating the state in which the labyrinth is formed by the relative rotation of the first seal member and the second seal member.

FIG. 6C is a partially enlarged view of FIG. 6B.

FIG. 7A is a schematic cross-sectional view illustrating an initial assembled state between the two members. FIG. 7B is a schematic cross-sectional view illustrating the state in which the labyrinth is formed by the relative rotation of the first seal member and the second seal member.

FIGS. 8A and 8B are views for illustrating a modified example of the sealing device according to the fourth embodiment, and is an enlarged view of the part X in FIG. 1. FIG. 8A is a schematic cross-sectional view illustrating the initial assembled state between the two members.

FIG. 8B is a schematic cross-sectional view illustrating the state in which the labyrinth is formed by the relative rotation of the first seal member and the second seal member.

DESCRIPTION OF THE EMBODIMENTS

Figure 1:
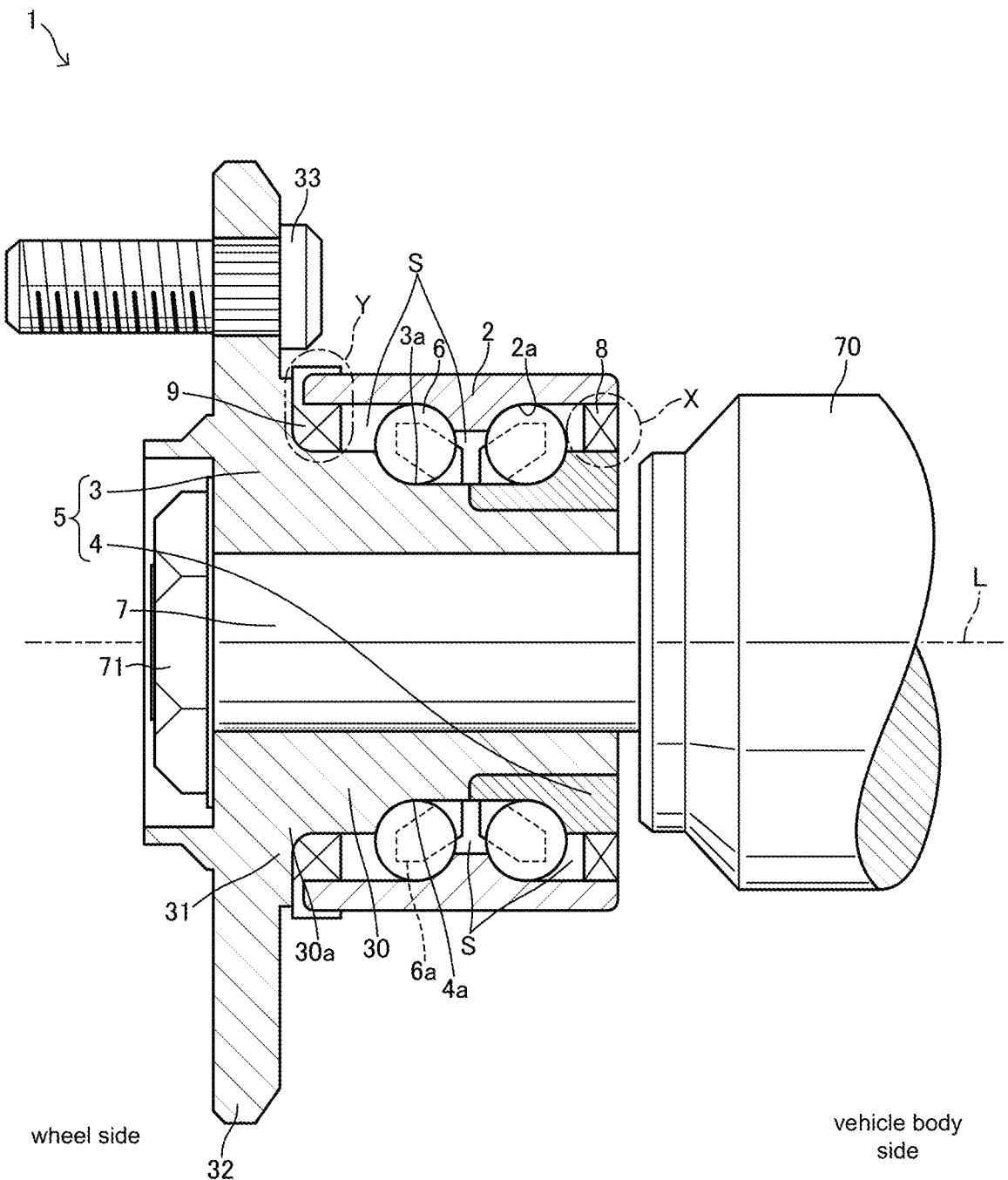
FIG. 1 is a schematic longitudinal cross-sectional view illustrating one example of the bearing device to which the sealing device according to one embodiment of the present invention is applied.

Each embodiment of the present invention is explained below based on the drawings. In some figures, part of detailed reference signs allotted to other figures are omitted. In addition, a side towards a wheel along a shaft L is hereinafter referred to as a wheel side, i.e., the left side of FIG. 1 and the like, and a side towards a vehicle body is referred to as a vehicle body side, i.e., the right side of FIG. 1 and the like.

A sealing device according to the present embodiment seals an annular space S formed by two members, a fixed side member 2 and a rotation side member 5 which rotates coaxially relative to the fixed side member 2, includes a first seal member 10 to be fitted to the rotation side member 5 and a second seal member 20 to be fitted to the fixed side member 2, and is provided between the two members in a state in which the first seal member 10 and the second seal member 20 are combined. The sealing device is provided with a coating layer 40 having an easily scraped property and being provided at least at one place in a gap between facing regions of the first seal member 10 and the second seal member 20 provided so as to face each other in an initial state in which the first seal member 10 and the second seal member 20 are combined; the coating layer 40 is provided so as to slidably contact a facing region thereof in a state in which the first seal member 10 and the second seal member 20 rotate relative to each other in the initial state. Therefore, when the rotation side member 5 rotates, the coating layer 40 slidably contacts either of the first seal member 10 or the second seal member 20, and the coating layer 40 is scraped by such sliding contact, thereby forming a minute gap. Then, the gap acts as a labyrinth having a sealing function. The details are explained below.

First Embodiment

First, a sealing device 8 according to the first embodiment is explained below with reference to FIG. 1 to FIG. 3. FIG. 1 illustrates a bearing device 1 on which the sealing device 8 is mounted. The bearing device 1 is constituted by including an outer ring 2 which supports a wheel of a vehicle, not illustrated, in an axially rotatable manner and generally corresponds to the above-described fixed side member, an inner ring 5 which corresponds to the above-described rotation side member, and two rows of rolling elements 6 . . . (balls) which are interposed between the outer ring 2 and the inner ring 5. The inner ring 5 is constituted as the rotation side member by a hub wheel 3 and an inner ring member 4, and the inner ring member 4 is integrally fitted to a vehicle body side of the hub wheel 3. A drive shaft 7 is coaxially spline-fitted to the hub wheel 3, and is connected to a drive source, i.e., a drive transmission portion, not illustrated, through a constant velocity joint 70. The drive shaft 7 is integrated with the hub wheel 3 by a nut 71, and thereby the hub wheel 3 is prevented from falling off from the drive shaft 7. The inner ring 5, i.e., the hub wheel 3 and the inner ring member 4, is a rotation member which is rotatable around the shaft L relative to the outer ring 2; the outer ring 2 and the inner ring 5 constitute two members which rotate relative to each other; and thereby the annular space S is formed. Inside the annular space S, two rows of rolling elements 6 . . . retained by a retainer 6a are rotatably interposed between a bearing ring 2a of the outer ring 2 and a bearing ring 3a of the hub wheel 3, and between the bearing ring 2a of the outer ring 2 and a bearing ring 4a of the inner ring member 4. The hub wheel 3 includes a hub wheel body 30 in a cylindrical shape, and a hub flange 32 which is formed so as to extend radially outward from the hub wheel body through a rising portion 31; the wheel is attached and fixed to the hub flange 32 by a bolt 33 and a nut, not illustrated. The sealing device 8 is provided for sealing the annular space S between the outer ring 2 and the inner ring member 4, and is attached to an end portion of the outer ring 2 on the vehicle body side.

The sealing device 8 includes the first seal member 10 and the second seal member 20. The first seal member 10 is formed by pressing a steel plate such as SPCC or SUS, and is formed in a cylindrical shape of which cross section on one side is approximately in a U shape. The first seal member 10 is provided with a first fitting cylindrical portion 12 in a cylindrical shape to be fitted onto an outer circumferential face 4b of the inner ring member 4, a first disk portion 13 extending in the outer diametrical direction from one end portion 12a of the first fitting cylindrical portion 12, and an extension cylindrical portion 11 extending in the axial direction from one end portion 13a of the first disk portion 13 on the outer diametrical side. Although not illustrated in the example illustrated in FIG. 2, a configuration can also be adopted, in which a magnetic encoder in a disk shape in which a N pole and a S pole are alternatively magnetized in the circumferential direction is provided on an outer face 13b of the first disk portion 13 on the vehicle body side and thereby rotational speed of the wheel or the like is detected by the magnetic encoder and a magnetic sensor, not illustrated, provided at the vehicle body.

The second seal member 20 includes a core body member 21 and a seal lip portion 24. The core body member 21 is formed by pressing a steel plate such as SPCC or SUS, and is formed in a cylindrical shape of which cross section on one side is approximately in an inverted L shape. The core body member 21 includes a second fitting cylindrical portion 22 in a cylindrical shape to be fitted to an inner circumferential face 2b of the outer ring 2 and a second disk portion 23 extending in the inner diametrical direction from one end portion 22a of the second fitting cylindrical portion 22. The second disk portion 23 has a first flat portion 23c on which the outer face 13b of the first disk portion 13 is stacked when sealing devices 8, 8 are stacked to each other and transported before assembling the sealing device 8 to the bearing device 1, a slope portion 23d which is inclined, and a second flat portion 23e extending in the inner diametrical direction. The seal lip portion 24 is made of an elastic body such as rubber, and includes a seal base portion 24a fixed to the core body member 21, a plurality of axial lips 24b, 24b which are formed by extending in the axial direction from the seal base portion 24a, a grease lip 24c extending inward in the diametrical direction, i.e., a side of the annular space S, from the seal base portion 24a, and an annular projection portion 24d provided on an outer diametrical side of the other end portion 22b of the second fitting cylindrical portion 22.

The seal base portion 24a is arranged so as to entirely cover an inner face side of the core body member 21, and one end portion of the seal base portion 24a is provided so as to wrap around one end portion 23a of the second disk portion 23 on an inner diametrical side. The other end of the seal base portion 24a is provided so as to wrap around the other end portion 22b of the second fitting cylindrical portion 22. The axial lips 24b, 24b are formed so as to be inclined obliquely in the outer diametrical direction toward a side of an inner face 13c of the first disk portion 13. A tip end portion 24ba of the axial lip 24b which is arranged on the inner diametrical side among the plurality of axial lips 24b, 24b is elastically deformed to slidably contact the inner face 13c of the first disk portion 13; and the axial lip 24b which is arranged on an outer diametrical side is provided in a non-contact state. The tip end portion 24ba of the axial lip 24b which slidably contacts the inner face 13c of the first disk portion 13 is filled with grease, not illustrated, for improving a sliding property. The grease lip 24c is formed to be inclined in an annular space S direction from a part of the seal base portion 24a on the inner diametrical side toward an inner face 12b of the first fitting cylindrical portion 12 which is arranged so as to face each other; and a tip end portion 24ca of the grease lip 24c slidably contacts the inner face 12b of the first fitting cylindrical portion 12 in an elastically deformed state. The tip end portion 24ca of the grease lip 24c which slidably contacts the inner face 12b of the first fitting cylindrical portion 12 is also filled with grease, not illustrated, for improving the sliding property. The annular projection portion 24d is formed to protrude toward the outer diametrical side; when the second seal member 20 is fitted to the inner circumferential face 2b of the outer ring 2, the annular projection portion 24d is provided so as to be interposed in a compressed state between the inner circumferential face 2b of the outer ring 2 and the seal base portion 24a. By interposing the annular projection portion 24d in the compressed state between the inner circumferential face 2b of the outer ring 2 and the seal base portion 24a, intrusion of muddy water or the like into a fitting region between the inner circumferential face 2b of the outer ring 2 and the second fitting cylindrical portion 22 of the core body member 21 from an outer space is suppressed.

The first seal member 10 and the second seal member 20 are combined so that the inner face 13c of the first disk portion 13 and an inner face 23b of the second disk portion 23 face each other in the axial direction. Further, the first seal member 10 and the second seal member 20 are arranged so that the extension cylindrical portion 11 and the second fitting cylindrical portion 22 face each other in the radial direction and so that the first disk portion 13 and the second disk portion 23 face each other in the axial direction. Furthermore, in the sealing device 8, the coating layer 40 having the easily scraped property is provided in the gap in the facing regions in which the first seal member 10 and the second seal member 20 are provided so as to face each other, i.e., a gap between an outer diametrical face 11b of the extension cylindrical portion 11 and an inner diametrical face 22c of the second fitting cylindrical portion 22, and a gap between one end portion 11a of the extension cylindrical portion 11 and the inner face 23b of the second disk portion 23. The coating layer 40 is softer than the seal lip portion 24 in a solidified state, and has a characteristic of being easily worn away. Specifically, in the initial state in which the first seal member 10 and the second seal member 20 are combined, in the gap between the outer diametrical face 11b of the extension cylindrical portion 11 and the inner diametrical face 22c of the second fitting cylindrical portion 22, the coating layer 40 is provided over an entire surface without any gaps. More specifically, the coating layer 40 is provided by applying a liquid coating agent to an inner diametrical fixed face 24aa of the seal base portion 24a fixed to the inner diametrical face 22c of the second fitting cylindrical portion 22. An initial application amount of the coating agent before solidifying is preferably executed so as to be slightly larger than an interval of the gap between the facing region, as illustrated by two-dot chain lines in FIG. 2A. Further, when the first seal member 10 and the second seal member 20 are combined in such a state, the coating agent is provided up to a side of an internal corner portion, i.e., a vicinity of the one end portion 22a of the second fitting cylindrical portion 22, which is constituted by the second fitting cylindrical portion 22 and the second disk portion 23. Furthermore, when the coating agent is solidified, the coating layer is further provided up to a gap formed by the one end portion 11a of the extension cylindrical portion 11, an inner face side of the first flat portion 23c of the second disk portion 23, and an inner face side of the slope portion 23d. The coating layer 40 becomes fixed to the inner diametrical fixed face 24aa and an outer diametrical fixed face 24ab of the seal base portion 24a, and also becomes in contact with the outer diametrical face 11b and the one end portion 11a of the extension cylindrical portion 11, referring to FIG. 2A.

The coating layer 40 used here is not particularly limited as long as the coating layer 40 has the easily scraped property, i.e., easiness to be scraped, in which the coating layer 40 is scraped by rotating the first seal member 10 and the second seal member 20 relative to each other, and thereby minute gaps L1, L2, referring to FIG. 2B, are constituted. After the minute gaps L1, L2 are formed, the coating layer 40 also has viscosity and shape retention which are maintained with the minute gaps L1, L2 ensured in the gap between the facing regions.

As for the coating agent becoming the coating layer 40, a solid lubricant, a liquid adhesive, or the like is exemplified. Although the solid lubricant is not particularly limited, molybdenum disulfide, graphite, PTFE (polytetrafluoroethylene), or the like can be adopted, for example; the solid lubricant having a coefficient of friction of 0.1 or less, for example, 0.04 to 0.1 etc., is adopted. Further, the solid lubricant can be mixed with a powdered additive which further reduces the coefficient of friction. According to the mentioned configuration, friction resistance until the gap is formed by scraping is suppressed. Furthermore, the solid lubricant can be mixed with a fluororesin agent having water repellency as binder. If a water-repellent material is used as the binder of the solid lubricant, since the fluororesin agent is not strong against friction, the easily scraped property of the coating layer 40 is not affected; a labyrinth passage is to be covered with the coating layer 40 having the water repellency after the gaps L1, L2 are formed, thereby more effectively preventing intrusion of muddy water or the like from the outside. Furthermore, when the solid lubricant with such a low coefficient of friction is adopted, even if abrasion powder after being scraped mixes with the grease filled in the axial lip 24b or the like, since the abrasion powder after being scraped also has a low coefficient of friction, an effect on grease of the lubricant is suppressed.

A layer thickness of the coating layer 40 is set to be approximately 500 μm to 2 mm since there is no gap between the facing regions in which the first seal member 10 and the second seal member 20 face each other. When the layer thickness becomes less than 500 μm, there is a fear that the inner diametrical fixed face 24aa of the seal base portion 24a and the outer diametrical face 11b of the extension cylindrical portion 11 contact each other at the time of rotation of the inner ring 5 or the like. Further, when the layer thickness exceeds 2 mm, design dimensions of the first seal member 10 and the second seal member 20 which constitute the sealing device 8 is affected.

In the example illustrated in FIG. 2A, the coating agent is applied to the inner diametrical fixed face 24aa of the second seal member 20; by combining the first seal member 10 and the second seal member 20, the coating agent is solidified in a state of being provided up to the internal corner portion, i.e., the vicinity of the one end portion 22a of the second fitting cylindrical portion 22, which is constituted by the second fitting cylindrical portion 22 and the second disk portion 23 as illustrated in FIG. 2A; and thereby the coating agent becomes the coating layer 40. Then, when the first seal member 10 and the second seal member 20 rotate relative to each other from the above-mentioned initial state, the coating layer 40 slidably contacts the first seal member 10 and is scraped by such sliding contact, thereby constituting the minute gaps L1, L2. More specifically, when the first seal member 10 and the second seal member 20 rotate relative to each other, the coating layer 40 which contacts the outer diametrical face 11b of the extension cylindrical portion 11 and the one end portion 11a of the extension cylindrical portion 11 is scraped until the coating layer 40 becomes a non-contact state relative to the outer diametrical face 11b of the extension cylindrical portion 11 and the one end portion 11a of the extension cylindrical portion 11, thereby forming the minute gaps L1, L2 as illustrated in FIG. 2B. The gaps L1, L2 formed as above are formed between the outer diametrical face 11b of the extension cylindrical portion 11 of the first seal member 10 and the coating layer 40 and between the one end portion 11a of the extension cylindrical portion 11 and the coating layer 40; in such a case, a side to be rotated can be either the first seal member 10 or the second seal member 20.

Herein, initial relative rotation of the first seal member 10 and the second seal member 20 for forming the gaps L1, L2 can form the minute gaps L1, L2 by rotating the inner ring member 4 as the rotation side member in such a manner that the sealing device 8 is attached between the outer ring 2 and the inner ring member 4 of the bearing device 1 illustrated in FIG. 1. In such a case, in a state in which the sealing device 8 is provided between the outer ring 2 and the inner ring member 4, the extension cylindrical portion 11 of the first seal member 10 and the second fitting cylindrical portion 22 of the second seal member 20 are provided so as to face each other in the radial direction; the one end portion 11a of the extension cylindrical portion 11 of the first seal member 10 and the second disk portion 23 of the second seal member 20 are provided so as to face each other in the axial direction. Then, between the above-described facing regions in the radial direction and in the axial direction, the coating layer 40 provided without any gaps is scraped by rotation of the inner ring member 4, thereby forming the minute gaps L1, L2 between the facing regions in the sealing device 8. The gaps L1, L2 formed as above achieve extremely small gap dimensions which are difficult to be formed by processing or the like. Therefore, the gaps L1, L2 act as the labyrinths having the sealing function, and a non-contact sealing structure is formed, thereby achieving torque reduction. Further, since the minute gaps L1, L2 are formed by the initial relative rotation after the first seal member 10 and 10) the second seal member 20 are combined, even if there is a dimensional tolerance between the first seal member 10 and the second seal member 20, variation in size of the gaps due to an influence of the dimensional tolerance is suppressed.

MODIFIED EXAMPLE

Next, a modified example of the sealing device 8 is described below with reference to FIG. 3A to FIG. 3C.

Explanations for configurations and effects which are common to the first embodiment are omitted.

Figure 3A:
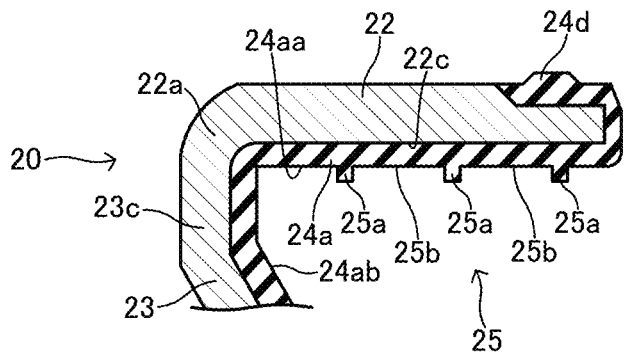
FIGS. 3A-3C are partially enlarged views for illustrating a modified example of the sealing device according to the first embodiment.
Figure 3B:
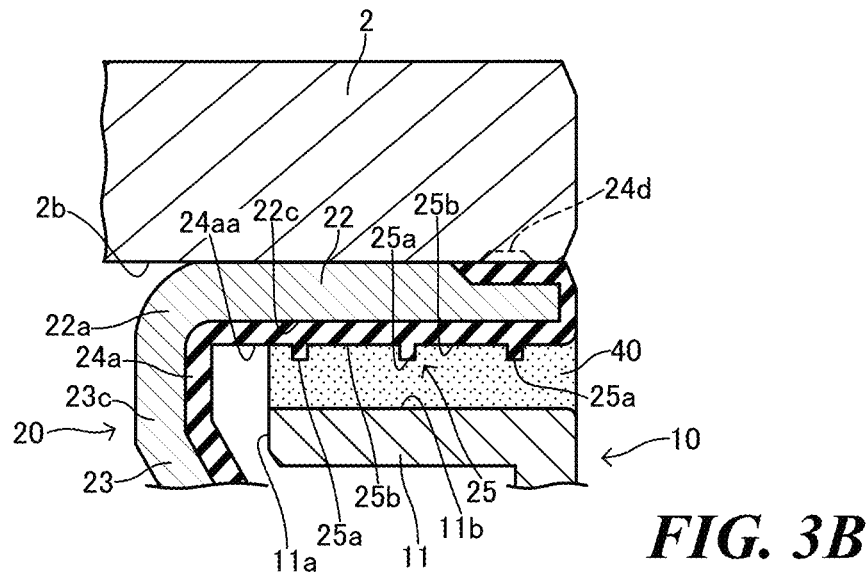
Figure 3C:
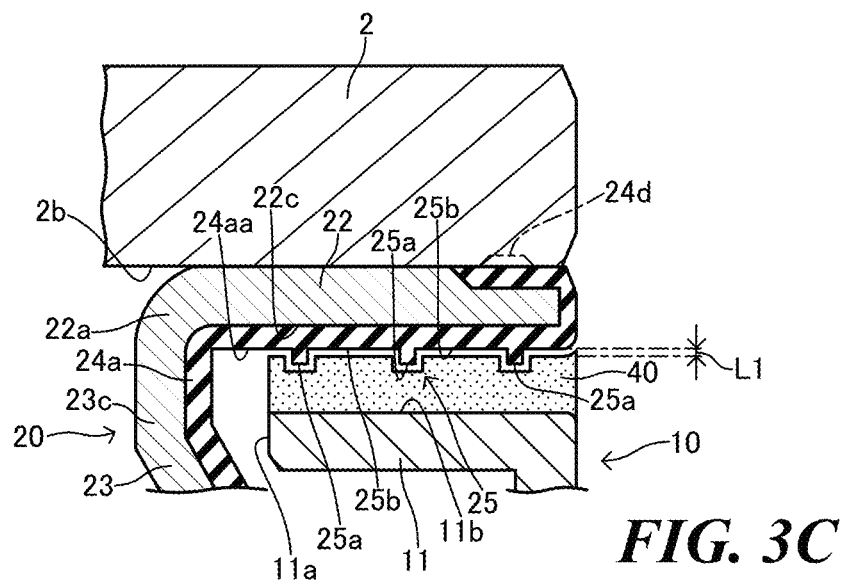

The modified example illustrated in FIG. 3A to FIG. 3C is different from the above-described embodiments in that, when the first seal member 10 and the second seal member 20 rotate relative to each other, the coating layer 40 slidably contacts the second seal member 20 and is scraped by such sliding contact, thereby constituting the minute gap L1. Further, the present modified example is different from the above-described embodiments in that a convex portion 25a which constitutes an uneven portion 25 at the inner diametrical fixed face 24aa of the seal base portion 24a is provided. A configuration of the uneven portion 25 is not limited to that in the figures; the number of the convex portion 25a can be greater than that in the figures as long as unevenness promotes the easily scraped property of the coating layer 40. Further, the convex portion 25a and a concave portion 25b illustrated in FIG. 3 each have a rectangular shape in a cross-sectional view, but can have a curved shape or a triangular shape. Furthermore, the uneven portion 25 can be provided over a whole circumference, can be provided intermittently at intervals even half the circumference, or can be arranged equally or randomly. As illustrated in FIG. 3A, when the uneven portion 25 is constituted at the inner diametrical fixed face 24aa, the coating agent is applied to approximately an entire surface of the outer diametrical face 11b of the first seal member 10, and thereby the coating layer 40 is provided on the outer diametrical face 11b of the extension cylindrical portion 11 of the first seal member 10. Thereafter, as illustrated in FIG. 3B, the first seal member 10 and the second seal member 20 are combined. Then, in a state in which the first seal member 10 and the second seal member 20 rotate relative to each other in the initial state in which the first seal member 10 and the second seal member 20 are combined, the coating layer 40 is surely scraped by the uneven portion 25, thereby forming the minute gaps L1, L2 on a side of the inner diametrical fixed face 24aa as illustrated in FIG. 3C.

Second Embodiment

Next, a sealing device 9 according to the second embodiment is explained below with reference to FIG. 4. Explanations for configurations and effects which are common to the first embodiment are omitted. The sealing device 9 is provided for sealing the annular space S between the outer ring 2 and the hub wheel 3, and is attached to the end portion of the outer ring 2 on the wheel side.

The sealing device 9 includes the first seal member 10 and the second seal member 20. The first seal member 10 is formed by pressing a steel plate such as SPCC or SUS, and is formed in a cylindrical shape of which cross section on one side is approximately in the U shape; the extension cylindrical portion 11 extending into the axial direction from the one end portion 13a of the first disk portion 13 on the outer diametrical side is provided with a step portion 11c which is formed in a stepped shape. The first disk portion 13 is provided up to a position approximately the same as an outer circumferential face 2c of the outer ring 2; in a state of being attached to the hub wheel 3, the extension cylindrical portion 11 is provided on the outer diametrical side further than the outer circumferential face 2c and is arranged so as to cover an end portion of the outer circumferential face 2c of the outer ring 2. The first fitting cylindrical portion 12 is fitted to the hub wheel body 30, and the first disk portion 13 is mounted in an abutting state against the rising portion 31.

The second seal member 20 includes the core body member 21 and the seal lip portion 24. The core body member 21 is formed by pressing a steel plate such as SPCC or SUS, and is formed in the cylindrical shape of which cross section on one side is approximately in the inverted L shape; the second fitting cylindrical portion 22 in the cylindrical shape is fitted to the outer circumferential face 2c of the outer ring 2. The axial lip 24b which is provided on the outer diametrical side among the plurality of axial lips 24b, 24b is formed so as to be inclined toward the one end portion 13a of the first disk portion 13 on the outer diametrical side. The axial lip 24b which is provided on the inner diametrical side among the plurality of axial lips 10) 24b, 24b is provided in contact with an inner diametrical side of the first disk portion 13; a space between the axial lips 24b, 24b is ensured larger than that in the first embodiment.

Figure 4A:
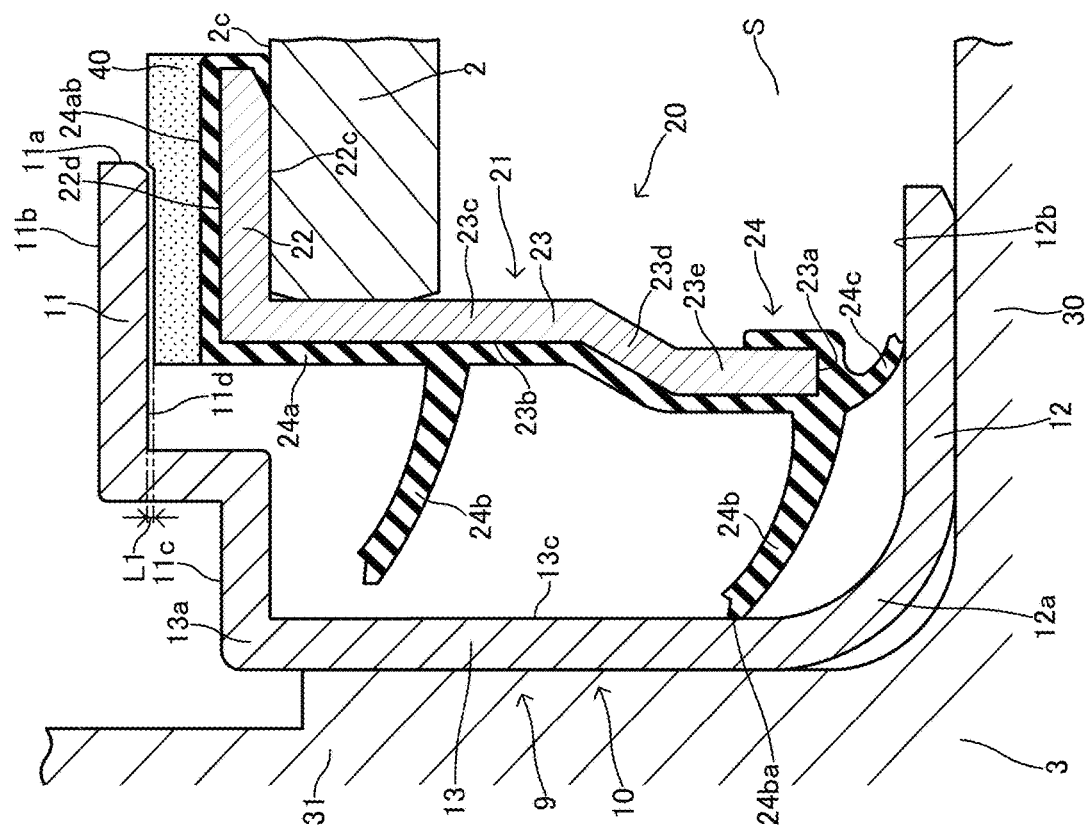
FIGS. 4A and 4B are views illustrating the second embodiment according to the present invention, and is an enlarged view of the part Y in FIG. 1.
Figure 4B:
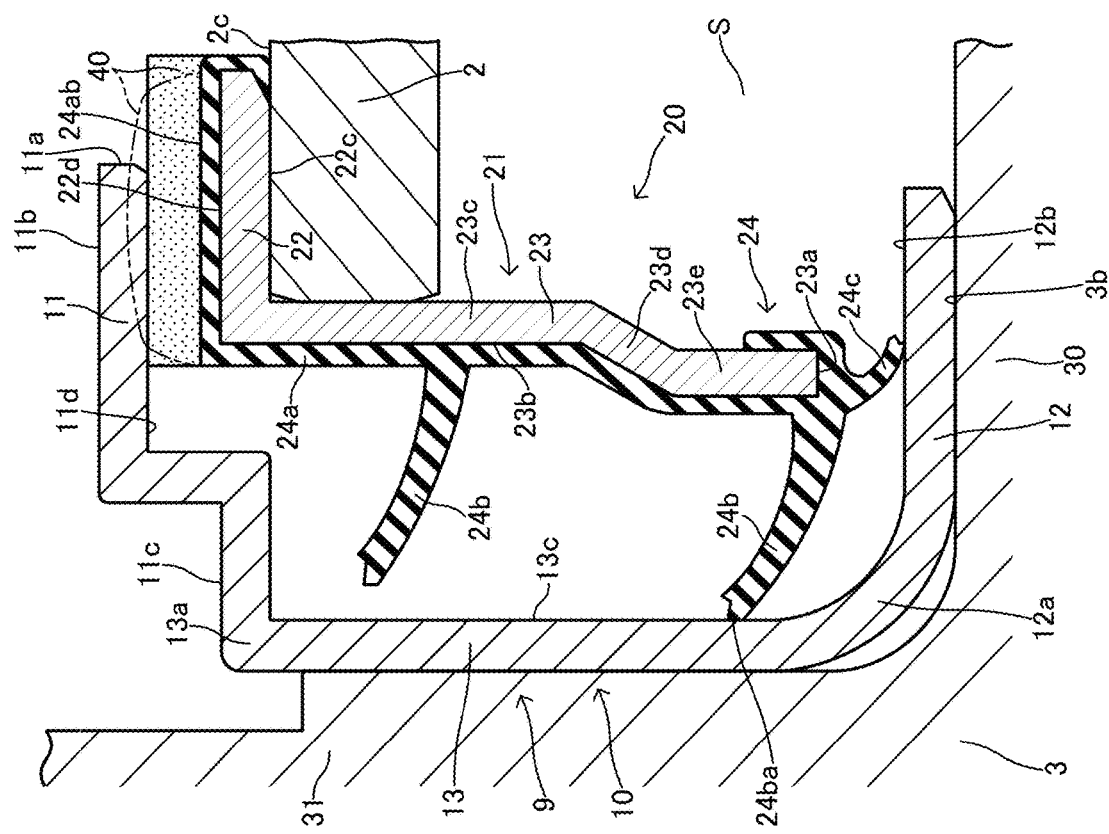

The first seal member 10 and the second seal member 20 are combined in such a manner that the inner face 13c of the first disk portion 13 and the inner face 23b of the second disk portion 23 face each other in the axial direction, are arranged in such a manner that the extension cylindrical portion 11 and the second fitting cylindrical portion 22 face each other in the radial direction, and are arranged in such a manner that the first disk portion 13 and the second disk portion 23 face each other in the axial direction, thereby constituting the sealing device 9. Further, in the sealing device 9, the coating layer 40 having the easily scraped property is provided without any gaps between an inner diametrical face 11d of the extension cylindrical portion 11 and an outer diametrical face 22d of the second fitting cylindrical portion 22 as illustrated in FIG. 4A. Specifically, in the initial state in which the first seal member 10 and the second seal member 20 are combined, the coating agent is applied to the outer diametrical fixed face 24ab of the seal base portion 24a fixed to the outer diametrical face 22d so that the coating agent is provided over an entire surface without any gaps between the inner diametrical face 11d of the extension cylindrical portion 11 and the outer diametrical face 22d of the second fitting cylindrical portion 22. That is, the coating layer 40 is fixed to the outer diametrical fixed face 24ab of the second seal member 20, and is provided so as to slidably contact the inner diametrical face 11d of the extension cylindrical portion 11 which is the first seal member 10. The initial application amount of the coating agent is slightly large such that the layer of the coating layer 40 becomes greater than the interval of the gap between the facing regions, as illustrated by two-dot chain lines in FIG. 4A. In such a state, when the first seal member 10 and the second seal member 20 are combined and rotate relative to each other from the initial state in which the first seal member 10 and the second seal member 20 are combined, the coating layer 40 is scraped by slidably contacting the inner diametrical face 11d of the extension cylindrical portion 11 which constitutes the first seal member 10. Then, the coating layer 40 is scraped until the coating layer 40 becomes in non-contact with the inner diametrical face 11d, thereby forming the minute gap L1 as illustrated in FIG. 4B. The minute gap L1 formed as above is formed between the inner diametrical face 11d of the extension cylindrical portion 11 of the first seal member 10 and the coating layer 40.

Like the first embodiment, the rotation of the first seal member 10 and the second seal member for forming the gap L1 can be formed by rotation of the hub wheel 3 as the rotation side member in such a manner that the sealing device 9 is mounted between the outer ring 2 and the hub wheel 3 of the bearing device 1 illustrated in FIG. 1; or the sealing device 9 can be mounted on the bearing device 1 after the gap L1 is formed by rotating the first seal member 10 and the second seal member 20 relative to each other at a stage before mounting.

By the above-described configuration, when the first seal member 10 and the second seal member 20 rotate relative to each other, the coating layer 40 slidably contacts the first seal member 10 and is scraped by such sliding contact, thereby forming the minute gap L1 between the facing regions in the sealing device 9; the gap L1 acts as the labyrinth having the sealing function and the non-contact sealing structure is constituted, thereby achieving torque reduction. Further, since the minute gap L1 is formed by the initial rotation after the first seal member 10 and the second seal member 20 are combined, even if there is a dimensional tolerance between the first seal member 10 and the second seal member 20, variation in size of the gap due to the influence of the dimensional tolerance is suppressed.

MODIFIED EXAMPLE

Next, a modified example of the sealing device 9 is described below with reference to FIG. 5A to FIG. 5C. Explanations for configurations and effects which are common to the above-described embodiments and the above-described modified example are omitted.

Figure 5A:
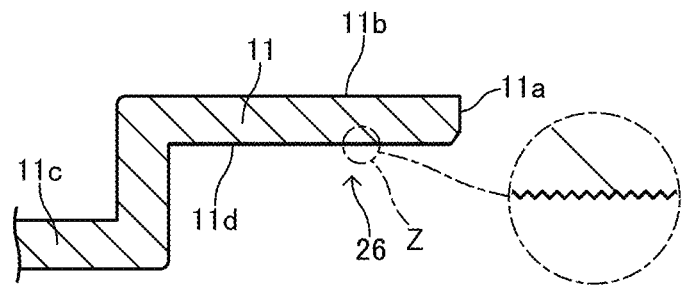
FIGS. 5A-5C are partially enlarged views for explaining a modified example of the sealing device according to the second embodiment.
Figure 5B:
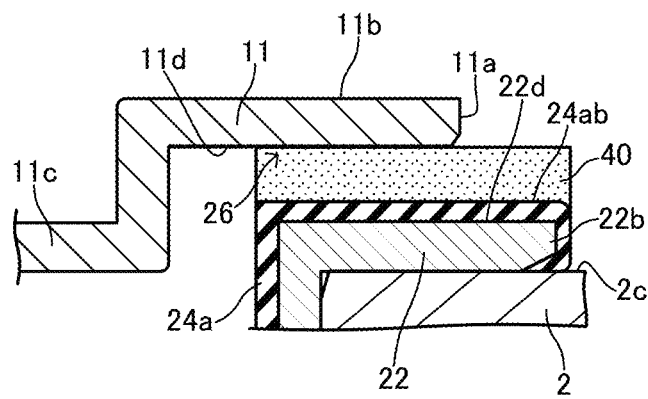
Figure 5C:
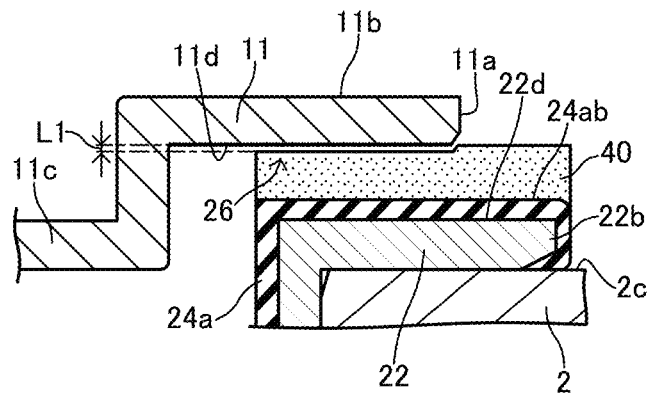

The modified example illustrated in FIG. 5A to FIG. 5C is different from the above-described embodiments in that a roughed surface portion 26 which is rougher than other surfaces is provided on the inner diametrical face 11*d* of the extension cylindrical portion 11 of the first seal member 10. Herein, the other surfaces refer to places other than the inner diametrical face 11*d* of the extension cylindrical portion 11 such as the outer diametrical face 11*b* of the extension cylindrical portion 11, the outer diametrical face 22*d* of the second fitting cylindrical portion 22, or the outer diametrical fixed face 24*ab*; and a surface of the inner diametrical face 11*d* is formed rougher than those other places. A degree of roughness of the roughed surface portion 26 is not particularly limited, and a minute uneven surface which promotes the easily scraped property of the coating layer 40 is sufficient. Also, roughness is not particularly limited, and a method of forming the roughed surface portion 26 is not particularly limited or can be shot peening or the like. Further, in an enlarged view of the part Z in FIG. 5A, the surface is almost uniformly uneven but can be randomly uneven. Furthermore, in the figures, an area in which the roughed surface portion 26 is provided is entirely provided over the inner diametrical face 11*d*; however, a surface which the coating layer 40 contacts can be the roughed surface portion 26. Moreover, the roughed surface portion 26 can be provided over the whole circumference or can be provided intermittently at intervals even half the circumference.

As illustrated in FIG. 5A, when the roughed surface portion 26 is provided on the inner diametrical face 11*d* of the extension cylindrical portion 11 which is the first seal member 10, the coating agent is applied to the outer diametrical fixed face 24*ab* of the second seal member 20, and thereafter the first seal member 10 and the second seal member 20 are combined as illustrated in FIG. 5B. Then, when the first seal member 10 and the second seal member 20 rotate relative to each other from the initial state in which the first seal member 10 and the second seal member 20 are combined, the coating layer 40 is surely scraped by the roughed surface portion 26, and thereby the minute gap L1 is formed on a side of the inner diametrical face 11*d* of the extension cylindrical portion 11 as illustrated in FIG. 5C.

Third Embodiment

Next, a sealing device 8A according to the third embodiment is explained with reference to FIG. 6. Explanations for configurations and effects which are common to the first embodiment are omitted. Similar to the sealing device 8 according to the first embodiment, the sealing device 8A is provided for sealing the annular space S between the outer ring 2 and the inner ring 4, and is attached to the end portion of the outer ring 2 on the vehicle body side.

In the sealing device 8A, the configuration of the first seal member 10 is similar to that of the first seal member 10 in the first embodiment, but is different in that the coating layer 40 is provided not on the outer diametrical face 11*b* of the extension cylindrical portion 11 but on the inner face 13*c* of the first disk portion 13. Further, the second seal member 20 includes the core body member 21 and the seal lip portion 24, which is the same as the second seal member 20 of the first embodiment. However, the axial lip 24*b* is not plural and a plurality of seal lip portions 24 which slidably contact the inner face 12*b* of the first fitting cylindrical portion 12 are arranged, which is different from the second seal member 20 of the first embodiment. Specifically, the seal lip portion 24 includes the axial lip 24*b* which is arranged so as to slidably contact the first disk portion 13 of the first seal member 10 in an axially facing manner, a radial lip 24*e* which faces the first fitting cylindrical portion 12 in the radial direction and slidably contacts the first fitting cylindrical portion 12 so as to be obliquely inclined toward a direction of the one end portion 12*a* of the first fitting cylindrical portion 12, and the grease lip 24*c* which faces the first fitting cylindrical portion 12 in the radial direction and slidably contacts the first fitting cylindrical portion 12 so as to be obliquely inclined on the side of the annular space S.

In the sealing device 8A, the coating layer 40 having the easily scraped property is provided without any gaps between the inner face 13*c* of the first disk portion 13 and the tip end portion 24*ba* of the axial lip 24*b*, as illustrated in FIG. 6A. Specifically, in the initial state in which the first seal member 10 and the second seal member 20 are combined, the coating agent is applied to the inner face 13*c* of the first disk portion 13 in such a manner that the coating layer is provided over an entire surface without any gaps between the inner face 13*c* of the first disk portion 13 and the tip end portion 24*ba* of the axial lip 24*b*. In such a case, a spot to which the coating agent is applied becomes the inner face 13*c* of the first disk portion 13 of the first seal member 10 which corresponds to a bottom surface approximately in the U shape, thereby application becomes easier. In a state in which the coating agent is applied, the coating agent is fixed to the inner face 13*c* of the first disk portion 13, and the axial lip 24*b* is provided so as to slidably contact the coating layer 40.

Also in the sealing device 8A, when the first seal member 10 and the second seal member 20 rotate relative to each other from the initial state in which the first seal member 10 and the second seal member 20 are combined, the coating layer 40 slidably contacts the second seal member 20 and the coating layer 40 is scraped by such sliding contact, thereby constituting a minute gap L3. Specifically, the coating layer 40 is scraped by the tip end portion 24*ba* of the axial lip 24*b* which constitutes the second seal member 20 until the coating layer 40 becomes non-contact with the tip end portion 24*ba*, thereby forming the minute gap L3 as illustrated in FIG. 6B. The minute gap L3 formed as above is formed between the tip end portion 24ba of the axial lip 24b and the coating layer 40. Initial rotation of the first seal member 10 and the second seal member 20 for forming the minute gaps L3 can be executed by the initial rotation after being mounted on the bearing device 1 in the same manner as the first embodiment, or the first seal member 10 and the second seal member 20 can be mounted on the bearing device 1 after the gap L3 is formed by rotating the first seal member 10 and the second seal member 20 relative to each other at a stage before being mounted on the bearing device 1.

By the above-mentioned configuration, when the first seal member 10 and the second seal member 20 rotate relative to each other, the coating layer 40 slidably contacts the tip end portion 24ba of the axial lip 24b constituting the second seal member 20 and is scraped by rotation due to such sliding contact, thereby constituting the minute gap L3 between the facing regions in the sealing device 8A. The gap L3 acts as the labyrinth having the sealing function and constitutes the non-contact sealing structure, thereby achieving reduction in torque of the bearing device 1. Further, since such minute gap L3 is formed by the initial rotation after the first seal member 10 and the second seal member 20 are combined, even if there is a dimensional tolerance between the first seal member 10 and the second seal member 20, variation in size of the gap due to the influence of the dimensional tolerance is suppressed.

Fourth Embodiment

Next, a sealing device 8B according to the fourth embodiment is explained with reference to FIG. 7 and FIG. 8. Explanations for configurations and effects which are common to the first embodiment are omitted.

In the sealing device 8B, configurations of the first seal member 10 and the second seal member are similar to those of the first seal member 10 and the second seal member 20 of the first embodiment, but are different in that the coating layer 40 is provided not only between the outer diametrical face 11b of the extension cylindrical portion 11 and the inner diametrical face 22c of the second fitting cylindrical portion 22 but also on the inner face 13c of the first disk portion 13.

Figure 7A:
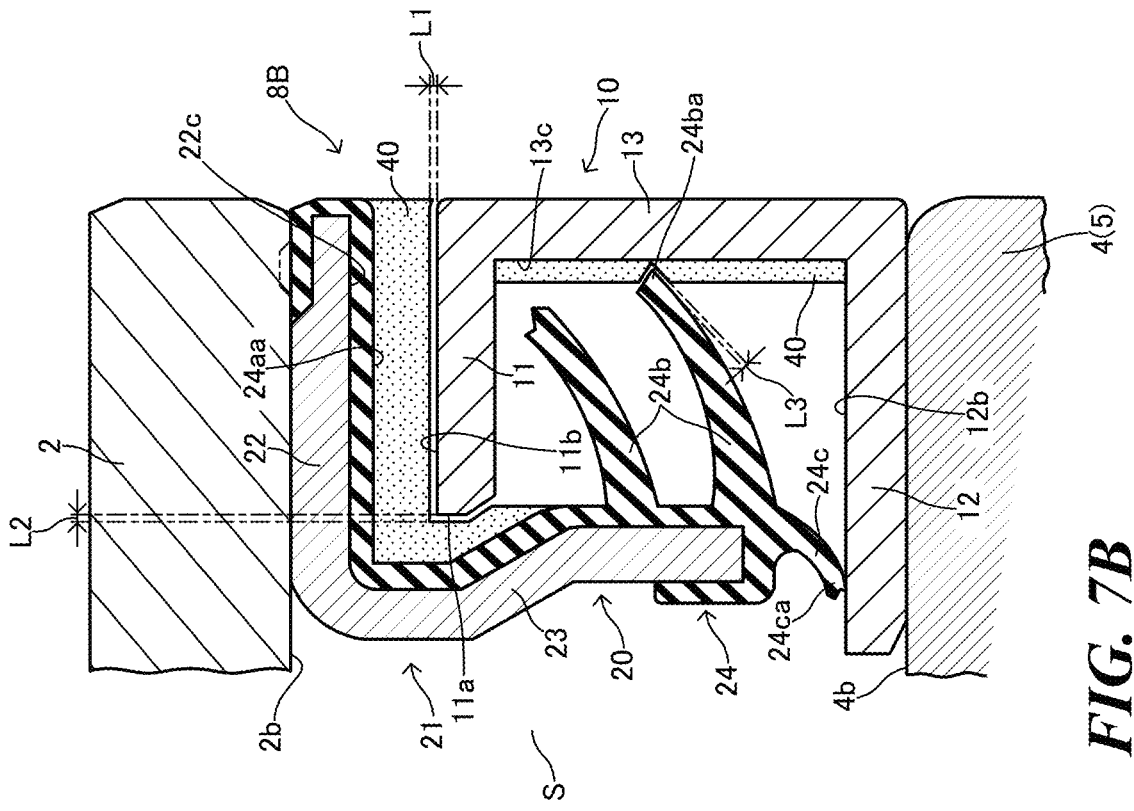
FIGS. 7A and 7B are views illustrating the fourth embodiment according to the present invention, and is an enlarged view of the Part X in FIG. 1.

In the sealing device 8B, the coating layer 40 having the easily scraped property is provided without any gaps between the outer diametrical face 11b of the extension cylindrical portion 11 and the inner diametrical face 22c of the second fitting cylindrical portion 22 and further between the inner face 13c of the first disk portion 13 and the tip end portion 24ba of the axial lip 24b, as illustrated in FIG. 7A. Specifically, in the initial state in which the first seal member 10 and the second seal member 20 are combined, between the outer diametrical face 11b of the extension cylindrical portion 11 and the inner diametrical face 22c of the second fitting cylindrical portion 22, the coating agent is applied to the inner diametrical fixed face 24aa of the seal base portion 24a fixed to the inner diametrical face 22c so that the coating layer is provided over the entire surface without any gaps. Further, also between the inner face 13c of the first disk portion 13 and the tip end portion 24ba of the axial lip 24b, the coating agent is applied to the inner face 13c of the first disk portion 13 so that the coating layer 40 is provided over the entire surface without any gaps.

Figure 7B:
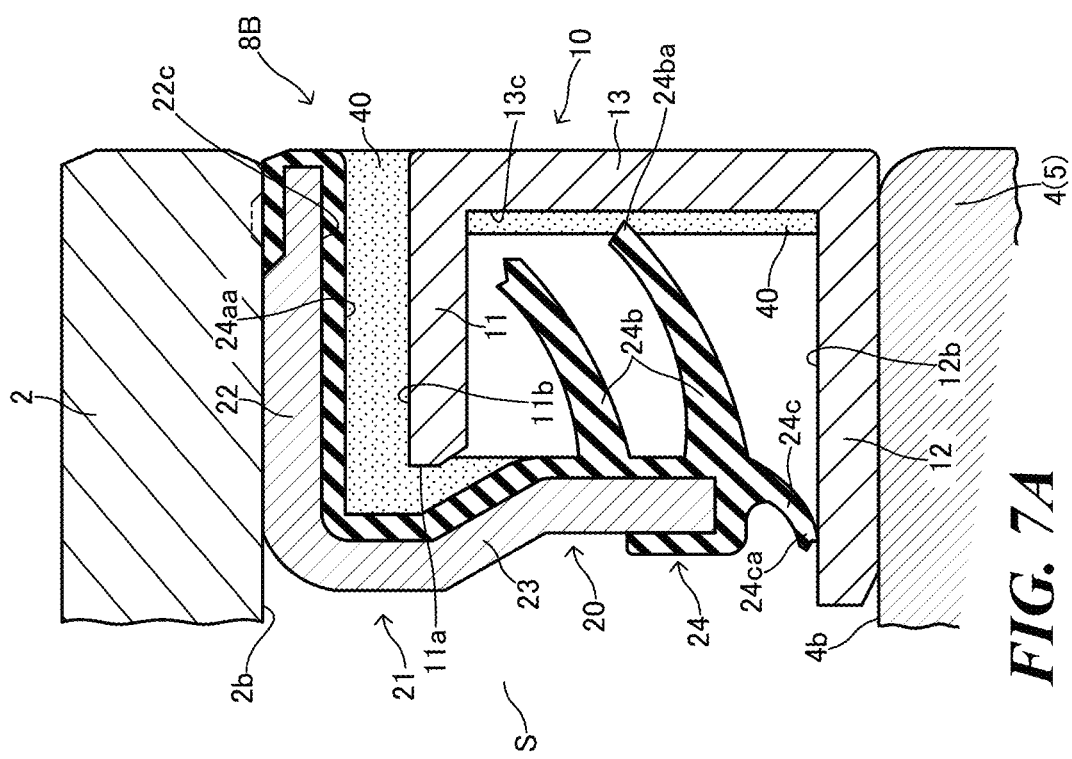

Also in the sealing device 8B, when the first seal member 10 and the second seal member 20 rotate relative to each other from the initial state in which the first seal member 10 and the second seal member 20 are combined, the coating layer 40 slidably contacts the first seal member 10 and the coating layer 40 is scraped by such sliding contact, thereby constituting the minute gaps L1, L2, L3 between the facing regions in the sealing device 8B. Specifically, the coating layer 40 slidably contacts the outer diametrical face 11b of the extension cylindrical portion 11 which constitutes the first seal member 10 and is scraped by such sliding contact until the coating layer 40 becomes non-contact relative to the inner diametrical face 22c, thereby forming the minute gaps L1, L2 as illustrated in FIG. 7B. Similarly, the tip end portion 24ba of the axial lip 24b constituting the second seal member 20 slidably contacts the coating layer 40, and the coating layer 40 is scraped until the tip end portion 24ba becomes non-contact with the coating layer 40, thereby forming the minute gap L3 as illustrated in FIG. 7B. The gap L3 formed as above is formed between the tip end portion 24ba of the axial lip 24b and the coating layer 40. The initial rotation of the first seal member 10 and the second seal member 20 for forming the gaps L1, L2, L3 can be executed in the same manner as the first embodiment by the initial rotation after being mounted on the bearing device 1, or the first seal member 10 and the second seal member 20 can be mounted on the bearing device 1 after the gaps L1, L2, L3 are formed by rotating the first seal member 10 and the second seal member 20 relative to each other at the stage before being mounted.

By the above-mentioned configuration, when the first seal member 10 and the second seal member 20 rotate relative to each other, the coating layer 40 slidably contacts the second seal member 20 and is scraped by rotation due to such sliding contact, thereby constituting the minute gaps L1, L2, L3 in the gap between the facing regions in the sealing device 8B. The gaps L1, L2, L3 act as the labyrinths having the sealing function and constitute the non-contact sealing structure, thereby achieving reduction in torque of the bearing device 1. Further, since such minute gaps L1, L2, L3 are formed by the initial rotation after the first seal member 10 and the second seal member 20 are combined, even if there is a dimensional tolerance between the first seal member 10 and the second seal member 20, variation in size of the gaps due to the influence of the dimensional tolerance is suppressed.

MODIFIED EXAMPLE

Next, a modified example of the above-described sealing device 8B is explained below with reference to FIG. 8A and FIG. 8B. Explanations for configurations and effects which are common to the first embodiment are omitted. A sealing device 8B' illustrated in FIG. 8A and FIG. 8 is different from the sealing device 8B in that the coating layer 40 having the easily scraped property is provided between the outer diametrical face 11b of the extension cylindrical portion 11 and the inner diametrical face 22c of the second fitting cylindrical portion 22 and is provided on the inner face 12b of the first fitting cylindrical portion 12.

Specifically, in the initial state in which the first seal member 10 and the second seal member are combined, between the outer diametrical face 11b of the extension cylindrical portion 11 and the inner diametrical face 22c of the second fitting cylindrical portion 22, the coating agent is applied to the inner diametrical fixed face 24aa of the seal base portion 24a fixed to the inner diametrical face 22c so that the coating layer 40 is provided over the entire surface without any gaps. Further, also between the inner face 12b of the first fitting cylindrical portion 12 and the tip end portion 24ca of the grease lip 24c, the coating agent is applied to the inner face 12*b* of the first fitting cylindrical portion 12 so that the coating layer 40 is provided over the entire surface without any gaps.

Also in the sealing device 8B', when the first seal member 10 and the second seal member 20 rotate relative to each other from the initial state in which the first seal member 10 and the second seal member 20 are combined, the coating layer 40 slidably contacts the first seal member 10 and is scraped by such sliding contact, thereby constituting minute gaps L1, L2, L4 between the facing regions in the sealing device 8B'. The coating layer 40 on a side of the outer diametrical face 11*b* of the extension cylindrical portion 11 which contacts the inner diametrical face 22*c* of the second fitting cylindrical portion 22 is scraped until the coating layer becomes non-contact relative to the inner diametrical face 22*c*, thereby forming the minute gaps L1, L2, as illustrated in FIG. 8B. Similarly, the tip end portion 24*ca* of the grease lip 24*c* which constitutes the second seal member 20 slidably contacts the coating layer 40 and the coating layer 40 is scraped until the tip end portion 24*ca* does not contact the coating layer 40, thereby forming the minute gap L4, as illustrated in FIG. 8B. The minute gap L4 formed as above is formed between the tip end portion 24*ca* of the grease lip 24*c* and the coating layer 40. Initial rotation of the first seal member 10 and the second seal member 20 for forming the minute gaps L1, L2, L4 can be executed by the initial rotation after being mounted on the bearing device 1 in the same manner as the first embodiment, or the first seal member 10 and the second seal member 20 can be mounted on the bearing device 1 after forming the gaps L1, L2, L4 by rotating the first seal member 10 and the second seal member 20 relative to each other at the stage before the mounting.

By the above-mentioned configuration, when the first seal member 10 and the second seal member 20 rotate relative to each other, the coating layer 40 slidably contacts the second seal member 20 and is scraped by such sliding contact, thereby forming the minute gaps L1, L2, L4 between the facing regions in the sealing device 8B'; the gaps L1, L2, L4 act as the labyrinths having the sealing function and constitute the non-contact sealing structure, thereby achieving torque reduction. Further, since such minute gaps L1, L2, L4 are formed by the initial rotation after the first seal member 10 and the second seal member 20 are combined, even if there is a dimensional tolerance between the first seal member 10 and the second seal member 20, variation in size of the gaps due to the influence of the dimensional tolerance is suppressed.

The sealing devices 8 to 8B', and 9 of the above-described embodiments are not limited to the shapes and structures in the figures. For example, the first seal member 10 and the core body member 21 are not limited to steel plates, but can be formed of a hard resin material or the like. Further, the shape and number of the seal lip portion 24 are not limited to those illustrated in the figures, and can be made of a resin material or the like having elasticity other than a rubber material. Although not illustrated, the annular magnetic encoder in which the N pole and the S pole are alternatively magnetized in the circumferential direction can be provided on a side of the outer face of the first disk portion 13 not only in the sealing device 8 but also in the sealing devices 8A to 8B'. Further, in the above-mentioned embodiment, an example is explained in which the fixed side member is the outer ring 2 and the rotation side member is the inner ring 5, but the present invention is not limited to such examples, and the fixed side member can be the inner ring and the rotation side member can be the outer ring.

Since the uneven portion 25 and the roughed surface portion 26 are provided to promote scrap performance of the coating layer 40, forming positions and configurations of the uneven portion and the roughed surface portion 26 are not limited to those in the figures. For example, in the case of the sealing device 8 illustrated in FIG. 2A and the sealing device 8B illustrated in FIG. 7A, the uneven portion 25 and the roughed surface portion 26 can be provided on the outer diametrical face 11*b* of the extension cylindrical portion 11. Further, in place of the uneven portion 25 illustrated in FIG. 3A to FIG. 3C, the roughed surface portion 26 can be provided on the seal base portion 24*a*; or in place of the roughed surface portion 26 illustrated in FIG. 5A to FIG. 5C, the uneven portion 25 can be provided on the inner diametrical face 11*d* of the extension cylindrical portion 11. Furthermore, the uneven portion 25 or the roughed surface portion 26 can be provided at the tip end portion 24*ba* of the axial lip 24*b* or the tip end portion 24*ca* of the grease lip 24*c*. Moreover, in the example of FIG. 7A, the uneven portion 25 and the roughed surface portion 26 can be combined according to the spot at which the gap is desirable to be formed, for example, in such a manner that the roughed surface portion 26 is provided at the tip end portion 24*ba* of the axial lip 24*b* while providing the uneven portion 25 on the outer diametrical face 11*b* of the extension cylindrical portion 11.

As for the coating agent, the liquid adhesive can also be suitably used in addition to the above; although not especially limited, a liquid adhesive of a curing reaction type can also be used, for example. In such a case, the coating agent is liquid and therefore is easily applied to the gap in the facing regions at which the coating layer 40 is arranged. In other words, the coating layer 40 is provided in such a manner that the first seal member 10 and the second seal member are not restricted by the facing regions and the shape of the gap of the facing regions. As for the liquid adhesive, an epoxy resin adhesive of a two-liquid curing type can be used, for example. In such a case, although a main agent and a curing agent are generally mixed in the same amount, the epoxy resin adhesive of the two-liquid curing type is preferably used by reducing a blending quantity of the curing agent so as not to completely harden. Further, when using the liquid adhesive, the solid lubricant as described above can be added and mixed in order to reduce sliding resistance.

Further, it is acceptable if the coating layer 40 is sufficient if provided at least at one spot in the gap of the facing regions in which the first seal member 10 and the second seal member 20 are provided so as to face each other, the coating layer 40 is not limited to those in the figures; for example, in the sealing device 8B of FIG. 7A, the coating layer can also be provided between the inner face 12*b* of the first fitting cylindrical portion 12 and the tip end portion 24*ca* of the grease lip 24*c*. Furthermore, the coating layer 40 which is provided at the gap between the facing regions is preferable to be arranged evenly without any gaps, but a slight gap including air bubbles or some places on which the coating layer 40 is not arranged is permitted.

Further, the coating layer 40 is not limited to ones which slidably contact either the first seal member 10 or the second seal member 20, and can be arranged in such a manner that the facing regions, for example, the coating layer which is provided on the first seal member 10 and the coating layer which is provided on the second seal member 20, slidably contact each other. That is, for example, by combining the first seal member 10 and the second seal member 20 after the coating agent is applied to each of the outer diametrical face 11*b* of the extension cylindrical portion 11 and the inner diametrical fixed face 24aa of the seal base portion 24a, the coating layers comes to face each other and can be arranged so as to slidably contact each other. Furthermore, the coating layer can be provided between the extension cylindrical portion 11 and the seal base portion 24a in such a manner that the coating agent is applied between the extension cylindrical portion 11 and the seal base portion 24a after combining the first seal member 10 and the second seal member 20 and thereafter the coating agent is solidified. In such a case, when the first seal member 10 and the second seal member 20 rotate relative to each other from the initial state, the coating layer is divided and the coating layers become sliding contact with each other.

Further, after the initial state in which the first seal member 10 and the second seal member 20 are combined, as long as either one of the first seal member 10 and the second seal member 20 contacts the coating layer 40 in such a manner that a space of the annular space S in the radial direction becomes narrow when the outer ring 2 and the inner ring 4 rotate relative to each other, there can be a slight gap within a dimensional tolerance, for example, between the coating layer and the first seal member 10 or between the coating layer 40 and the second seal member 20 when installing the first seal member 10 and the second seal member 20.

Furthermore, the first seal member 10 and the second seal member 20 do not necessarily need to be mounted on the bearing device 1 in the combined state. For example, the first seal member 10 and the second seal member 20 can be combined when the outer ring 2 and the inner ring 5 are assembled after the first seal member 10 is mounted on the inner ring 5 and the second seal member 20 is mounted on the outer ring 2.

DESCRIPTION OF THE REFERENCE NUMERAL 1 bearing device
2 outer ring (fixed side member)
5 inner ring (rotation side member)
8, 8A, 8B, 8B', 9 sealing device
S annular space
10 first seal member
20 second seal member
25 uneven portion
26 roughed surface portion
40 coating layer
L1, L2, L3, L4 gap

The invention claimed is:

1. A sealing device to seal an annular space formed by two members, a fixed side member and a rotation side member which rotates coaxially relative to the fixed side member, the sealing device comprising:
a first seal member to be fitted to the rotation side member and a second seal member to be fitted to the fixed side member, the sealing device capable of being provided between the two members in a state in which the first seal member and the second seal member are combined; and
a coating layer having an easily scraped property, having shape retention when scraped, and being provided without any gaps at least at one place between facing regions in which the first seal member and the second seal member are provided so as to face each other in an initial state in which the first seal member and the second seal member are combined,
wherein a gap is formed when the coating layer is scraped by slidably contacting a region of the first seal member or the second seal member to which the coating layer faces in a state in which the first seal member and the second seal member rotate relative to each other from the initial state, and the gap has a sealing function.

2. The sealing device according to claim 1, wherein:
the first seal member comprises a first fitting cylindrical portion to be fitted to the rotation side member, a first disk portion extending in outer diametrical direction from one end portion of the first fitting cylindrical portion, and an extension cylindrical portion extending in axial direction from one end portion of the first disk portion on an outer diametrical side,
the second seal member comprises a second fitting cylindrical portion to be fitted to the fixed side member,
the extension cylindrical portion of the first seal member and the second fitting cylindrical portion of the second seal member are provided so as to face each other in radial direction in a state in which the sealing device is provided between the fixed side member and the rotation side member, and
the gap between the facing regions is a gap between the extension cylindrical portion and the second fitting cylindrical portion.

3. The sealing device according to claim 1, wherein;
the first seal member comprises a first fitting cylindrical portion to be fitted to the rotation side member and a first disk portion extending in outer diametrical direction from one end portion of the first fitting cylindrical portion,
the second seal member comprises a core body member having a second fitting cylindrical portion to be fitted to the fixed side member, and a seal lip portion fixed to the core body member,
the seal lip portion is provided so as to slidably contact the first disk portion of the first seal member, the seal lip portion and the first disk portion facing each other in axial direction, and
the gap between the facing regions is a gap between the first disk portion and the seal lip portion.

4. The sealing device according to claim 2,
wherein an uneven portion or a roughed surface portion of which surface is rougher than other surfaces is provided on at least either one of surfaces in which the extension cylindrical portion and the second fitting cylindrical portion face each other.

5. The sealing device according to claim 1,
wherein the coating layer is composed of a solid lubricant into which a powdered additive to reduce a coefficient of friction is mixed.

6. The sealing device according to claim 1,
wherein the coating layer is composed of a liquid adhesive of a curing reaction type.

7. The sealing device according to claim 2,
wherein the coating layer is composed of a solid lubricant into which a powdered additive to reduce a coefficient of friction is mixed.

8. The sealing device according to claim 2,
wherein the coating layer is composed of a liquid adhesive of a curing reaction type.

9. The sealing device according to claim 2, wherein:
the second seal member further has a second disk portion extending into an inner diameter direction from one end of the second fitting cylindrical portion, and the gap between the facing regions is a gap between one end of an extension cylindrical portion and the second disk portion.

10. The sealing device according to claim 2, wherein:

the second seal member has a core body member having the second fitting cylindrical portion and a seal lip portion fixed to the core body member, the seal lip portion faces the first fitting cylindrical portion of the first seal member in a diametrical direction so as to have slidable contact, and the gap between facing regions is a gap between the first fitting cylindrical portion and the seal lip portion.

11. The sealing device according to claim 4, wherein:

the second seal member has a core body member having the second fitting cylindrical portion and a seal lip portion fixed to the core body member, the seal lip portion faces the first fitting cylindrical portion of the first seal member in a diametrical direction so as to have slidable contact, and the gap between facing regions is a gap between the first fitting cylindrical portion and the seal lip portion.

* * * * *